US008700287B2

(12) United States Patent
Javaherian et al.

(10) Patent No.: US 8,700,287 B2
(45) Date of Patent: Apr. 15, 2014

(54) HIGH-ACCURACY IMEP COMPUTATIONAL TECHNIQUE USING A LOW-RESOLUTION ENCODER AND A CUBIC SPLINE INTEGRATION PROCESS

(75) Inventors: Hossein Javaherian, Rochester Hills, MI (US); Ibrahim Haskara, Macomb, MI (US); Oguz H. Dagci, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1086 days.

(21) Appl. No.: 12/713,098

(22) Filed: Feb. 25, 2010

(65) Prior Publication Data

US 2011/0208404 A1 Aug. 25, 2011

(51) Int. Cl.

| | |
|---|---|
| ***G06F 19/00*** | (2011.01) |
| ***G06G 7/70*** | (2006.01) |
| ***G06F 7/00*** | (2006.01) |
| ***G06F 17/00*** | (2006.01) |
| ***G01M 15/00*** | (2006.01) |

(52) U.S. Cl.
USPC ............................ 701/102; 701/101; 701/111

(58) Field of Classification Search
USPC ............... 73/114.13, 114.14, 114.15, 114.16, 73/114.17, 114.18; 701/101, 102, 103, 701/111; 703/2
See application file for complete search history.

(56) References Cited

U.S. PATENT DOCUMENTS

| | | | | |
|---|---|---|---|---|
| 4,111,041 | A * | 9/1978 | Rice | 73/114.17 |
| 5,229,945 | A * | 7/1993 | Demizu et al. | 701/102 |
| 7,073,485 | B2 * | 7/2006 | Truscott et al. | 123/406.22 |
| 7,267,103 | B2 | 9/2007 | Yasui | |
| 2007/0250249 | A1 * | 10/2007 | Okubo et al. | 701/103 |

FOREIGN PATENT DOCUMENTS

| | | | | |
|---|---|---|---|---|
| EP | 881478 A1 | * 12/1998 | | G01M 15/00 |
| EP | 1744043 | * 1/2007 | | F02D 41/14 |
| JP | 11-182357 | * 7/1999 | | F02M 25/07 |

* cited by examiner

*Primary Examiner* — Stephen K Cronin
*Assistant Examiner* — Raza Najmuddin
(74) *Attorney, Agent, or Firm* — John A. Miller; Miller IP Group, PLC

(57) ABSTRACT

A method for computing indicated mean effective pressure (IMEP) in an internal combustion engine using sparse input data. The method uses a cubic spline integration approach, and requires significantly lower resolution crankshaft position and cylinder pressure input data than existing IMEP computation methods, while providing calculated IMEP output results which are very accurate in comparison to values computed by existing methods. By using sparse input data, the cubic spline integration method offers cost reduction opportunities for a manufacturer of vehicles, engines, and/or electronic control units, through the use of lower cost sensors and the consumption of less computing resources for data processing and storage.

20 Claims, 3 Drawing Sheets

HIGH-ACCURACY IMEP COMPUTATIONAL TECHNIQUE USING A LOW-RESOLUTION ENCODER AND A CUBIC SPLINE INTEGRATION PROCESS

BACKGROUND OF THE INVENTION

1. Field of the Invention

This invention relates generally to a method for computing mean effective pressure in an engine and, more particularly, to a method for computing indicated mean effective pressure (IMEP) in an internal combustion engine using a cubic spline integration method which provides a highly accurate result even when using a low-resolution crankshaft position encoder and using less frequent measurement of cylinder pressure input data than required by existing IMEP calculation methods.

2. Discussion of the Related Art

Most modern internal combustion engines employ a number of sophisticated control strategies to optimize performance, fuel economy, emissions, and other factors. Among the many parameters used to control an engine's operation, indicated mean effective pressure (IMEP) is one of the more important. IMEP is used as a measure of the amount of work an engine is performing, or as a measure of the torque that is being provided by the engine. Engine control strategies are often designed around IMEP, and of course these strategies will be effective for controlling the engine only if IMEP is calculated with a sufficient degree of accuracy.

While methods for calculation of IMEP are known in the art, existing methods require a high-resolution crankshaft position encoder and frequent measurement of cylinder pressure data in order to obtain an accurate IMEP calculation. Requiring high-resolution crankshaft position and cylinder pressure data has a number of disadvantages, including the cost of the crank position encoder, the cost associated with the digital memory required to store the high-resolution cylinder pressure data over time, and the cost associated with computing power needed in electronic control units in order to process the large amounts of crank position and cylinder pressure data for IMEP calculations.

A need exists for a method of calculating indicated mean effective pressure which provides the accuracy needed for proper control of the engine, but which does not require high-resolution crankshaft position and cylinder pressure data as input. Such a method can provide a significant benefit in terms of cost savings and simplification for a manufacturer of engines or vehicles.

SUMMARY OF THE INVENTION

In accordance with the teachings of the present invention, a cubic spline integration method is disclosed for computing indicated mean effective pressure (IMEP) in an internal combustion engine using sparse input data. The cubic spline integration method requires significantly lower resolution crankshaft position and cylinder pressure input data than existing IMEP computation methods, while providing calculated IMEP output results which are very accurate in comparison to values computed by existing methods. By using sparse input data, the cubic spline integration method enables the use of a low-resolution crankshaft position encoder and requires less computing resources for data processing and storage.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an cubic spline integration method for calculating indicated mean effective pressure in an engine using sparse input data is merely exemplary in nature, and is in no way intended to limit the invention or its applications or uses. For example, pumping mean effective pressure and net mean effective pressure can also be calculated using the methods of the present invention.

Engines in most modern automobiles use sophisticated electronic control units for the purpose of controlling many parameters of engine operation—including the amount and timing of fuel injection, spark timing for spark ignition engines, the amount of exhaust gas recirculation to be used, and boost pressure for turbo-charged or super-charged engines. These parameters and others are precisely controlled in an effort to optimize engine performance, fuel economy, and emissions. In many engine controllers, indicated mean effective pressure (IMEP) is used as an important input parameter to the control strategy. IMEP may be thought of as the average pressure over a power cycle in the combustion chamber of an engine, and it is therefore also representative of the work done by the engine during one cycle, or the torque being output by the engine over one cycle. IMEP is normally measured only during the power cycle of an engine, which includes the compression stroke and the expansion or power stroke. IMEP can be used to design an engine control strategy which strives to match the actual torque being delivered by the engine with the torque being requested by the driver by way of accelerator pedal position.

Other pressure-related parameters can also be useful in engine control strategies. Pumping mean effective pressure (PMEP) is the average pressure over a pumping cycle (exhaust and intake strokes) in the combustion chamber of an engine. Net mean effective pressure (NMEP) is the average pressure over a complete four-stroke cycle in the combustion chamber of an engine. That is, net mean effective pressure is the sum of indicated mean effective pressure and pumping mean effective pressure. The ensuing discussion and equations are written in terms of IMEP. However, it will be recognized by one skilled in the art that the methods of the present invention are applicable to any calculation of mean effective pressure (IMEP, PMEP, or NMEP) by simply selecting the integral range appropriate for the cycle.

Figure 1:
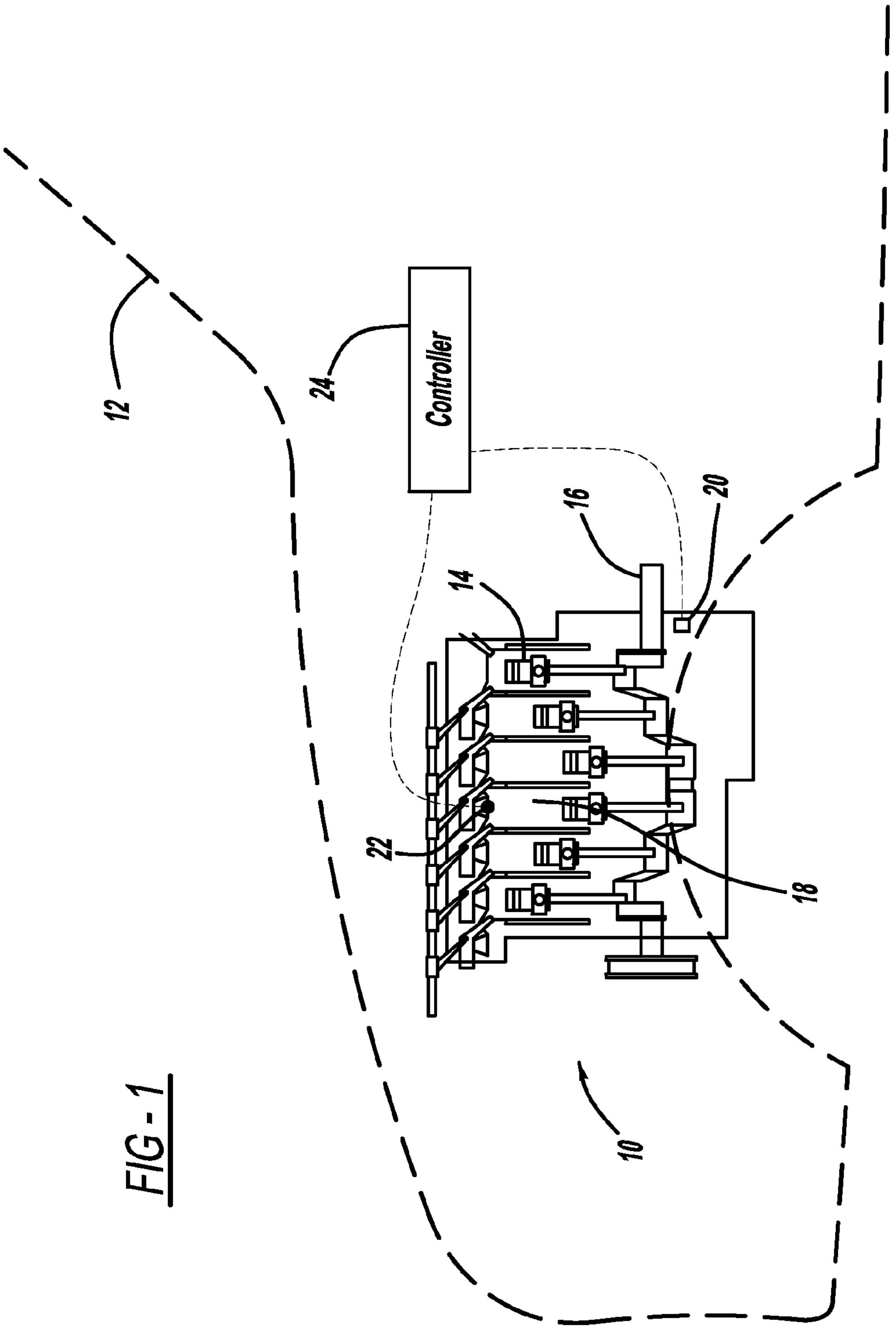
FIG. 1 is a diagram of a multi-cylinder engine in a vehicle, showing the elements involved in computing indicated mean effective pressure.

FIG. 1 is a diagram showing an internal combustion engine 10 in a vehicle 12. The engine 10 includes a plurality of pistons 14 connected to a crankshaft 16. Each piston 14 travels reciprocally through a cylinder 18, while the crankshaft 16 provides output torque to perform useful work, such as driving the vehicle's wheels or charging an electrical system. In order to calculate IMEP, crankshaft position data from a crankshaft position encoder 20 is required, along with in-cylinder pressure data from a cylinder pressure sensor 22. The engine 10 can include a pressure sensor 22 in every cylinder 18, or as few as one or two cylinder pressure sensors 22 in the entire engine 10. Data from the crankshaft position encoder 20 and the cylinder pressure sensor 22 are collected by an engine controller 24, which also calculates IMEP and manages engine operation.

A standard definition of IMEP is shown in Equation (1).

$$IMEP = \frac{1}{V_{cyl}} \int P \cdot dV \tag{1}$$

Where $V_{cyl}$ is cylinder volume, P is cylinder pressure, dV is incremental cylinder volume, and the integral is taken over an engine power cycle running from a crank position of $-\pi$ to $+\pi$ (or Bottom Dead Center (BDC) through one revolution back to BDC).

Various methods of calculating IMEP during engine operation are known in the art. One common IMEP calculation method is the trapezoidal approximation, where the integral of Equation (1) is discretized in small increments of volume and summed over an engine power cycle. The trapezoidal approximation of IMEP is shown in Equation (2).

$$IMEP \cong \frac{1}{V_{cyl}} \sum_{k=\theta_o}^{\theta_f} \frac{P_{k+1} + P_k}{2} \cdot (V_{k+1} - V_k) \tag{2}$$

Where $P_k$ and $P_{k+1}$ are successive cylinder pressure measurements, $V_k$ and $V_{k+1}$ are cylinder volume measurements corresponding to $P_k$ and $P_{k+1}$, and the summation is taken in increments of k from a value $\theta_0$ to a value $\theta_f$.

Although the trapezoidal approximation IMEP calculation of Equation (2) is widely used, it is very sensitive to sampling resolution. That is, the trapezoidal approximation only yields an accurate value of IMEP if the pressure and volume increments k are very small—typically 1 degree of crank rotation or less. The need for high-resolution crankshaft position and cylinder pressure data means that the crankshaft position encoder 20 must have high-resolution capability, and it means that cylinder pressure data must be taken and processed very frequently. While these capabilities exist in engines today, they drive higher costs in the form of the encoder 20 itself, and analog-to-digital conversion, data processing and storage requirements for the volume of cylinder pressure data.

The goal of the present invention is to relax the requirement for high-resolution crank position and cylinder pressure data by providing a method of computing IMEP which is accurate even when the crank position and cylinder pressure data is measured far less frequently than every degree of crank angle. This would allow the crankshaft position encoder 20 to be a lower-cost, lower-resolution model, and would require significantly less cylinder pressure data to be processed and stored. This in turn would allow the total cost of a pressure-based control system for the engine 10 to be reduced.

In a first embodiment of the present invention, an indirect integration method of computing IMEP in an engine is provided. The indirect integration method begins with the introduction of a term $PV^n$, where P is pressure, V is volume, and n is the ratio of specific heats. By definition, $$d(PV^n) = V^n dP + nV^{n-1} PdV \tag{3}$$

and $$d(PV) = VdP + PdV \tag{4}$$

Rearranging and integrating Equations (3) and (4) yields;

$$\int PdV = \frac{1}{n-1} \cdot \left[ \int \frac{1}{V^{n-1}} \cdot d(PV^n) - \int d(PV) \right] \tag{5}$$

If the integral of Equation (5) is taken over a crank angle range from $\theta_0$ to $\theta_f$, Equation (5) can be discretized and written as;

$$\int_{\theta_0}^{\theta_f} PdV \cong \frac{1}{n-1} \cdot \left[ \frac{1}{V^{n-1}} \cdot d(PV^n)\Big|_{\theta_o}^{\theta_f} - (PV)\Big|_{\theta_o}^{\theta_f} \right] \tag{6}$$

It can be seen that the left-hand side of Equation (6) is the definition of IMEP from Equation (1), with the exception that the $(1/V_{cyl})$ factor is missing. It therefore follows that IMEP can be approximated as the right-hand side of Equation (6), multiplied by the $(1/V_{cyl})$ factor, as follows;

$$IMEP \cong \frac{1}{V_{cyl} \cdot (n-1)} \cdot \left[ \frac{1}{V^{n-1}} \cdot d(PV^n)\Big|_{\theta_o}^{\theta_f} - (PV)\Big|_{\theta_o}^{\theta_f} \right] \tag{7}$$

Equation (7) can then be expanded and written as a summation of discrete measurements, as follows;

$$IMEP \cong \frac{1}{V_{cyl} \cdot (n-1)} \cdot \sum \left[ P_{k+\Delta} \left( \frac{V_{k+\Delta}^n}{V_k^{n-1}} - V_{k+\Delta} \right) - P_k \left( \frac{V_k^n}{V_k^{n-1}} - V_k \right) \right] \tag{8}$$

Where k is the sampling event number, Δ is the increment of crank angle between samples, and the remaining terms are as defined above.

It is then possible to define variables $G_k$ and $H_k$ to represent the volume terms of Equation (8), as follows;

$$G_k = \frac{V_{k+\Delta}}{(n-1)} \cdot \left( \frac{V_{k+\Delta}^{n-1}}{\frac{1}{\Delta} \left( \sum_{j \in [k, k+\Delta]} V_j^{n-1} \right)} - 1 \right) \tag{9}$$

$$H_k = \frac{V_k}{(n-1)} \cdot \left( \frac{V_k^{n-1}}{\frac{1}{\Delta} \left( \sum_{j \in [k, k+\Delta]} V_j^{n-1} \right)} - 1 \right) \tag{10}$$

It is notable that the variables $G_k$ and $H_k$ contain only constants and volume-related terms, which are known functions of cylinder volume and crank position. Therefore $G_k$ and $H_k$ can be computed offline and stored for any particular engine geometry, as they do not depend on cylinder pressure or any other real-time engine performance factor.

Substituting $G_k$ and $H_k$ into Equation (8) yields;

$$IMEP \cong \frac{1}{V_{cyl}} \sum [P_{k+\Delta} \cdot G_k - P_k \cdot H_k] \tag{11}$$

Again, it is noteworthy that $V_{cyl}$ is a constant, and the terms $G_k$ and $H_k$ are pre-computed and known for each sampling event k. Therefore, IMEP can be calculated using Equation (11) by simply multiplying a cylinder pressure measurement, $P_{k+\Delta}$, by its volume-related term, $G_k$, subtracting the product of the previous cylinder pressure measurement, $P_k$, and its volume-related term, $H_k$, and summing the results over an engine power cycle.

Figure 2:
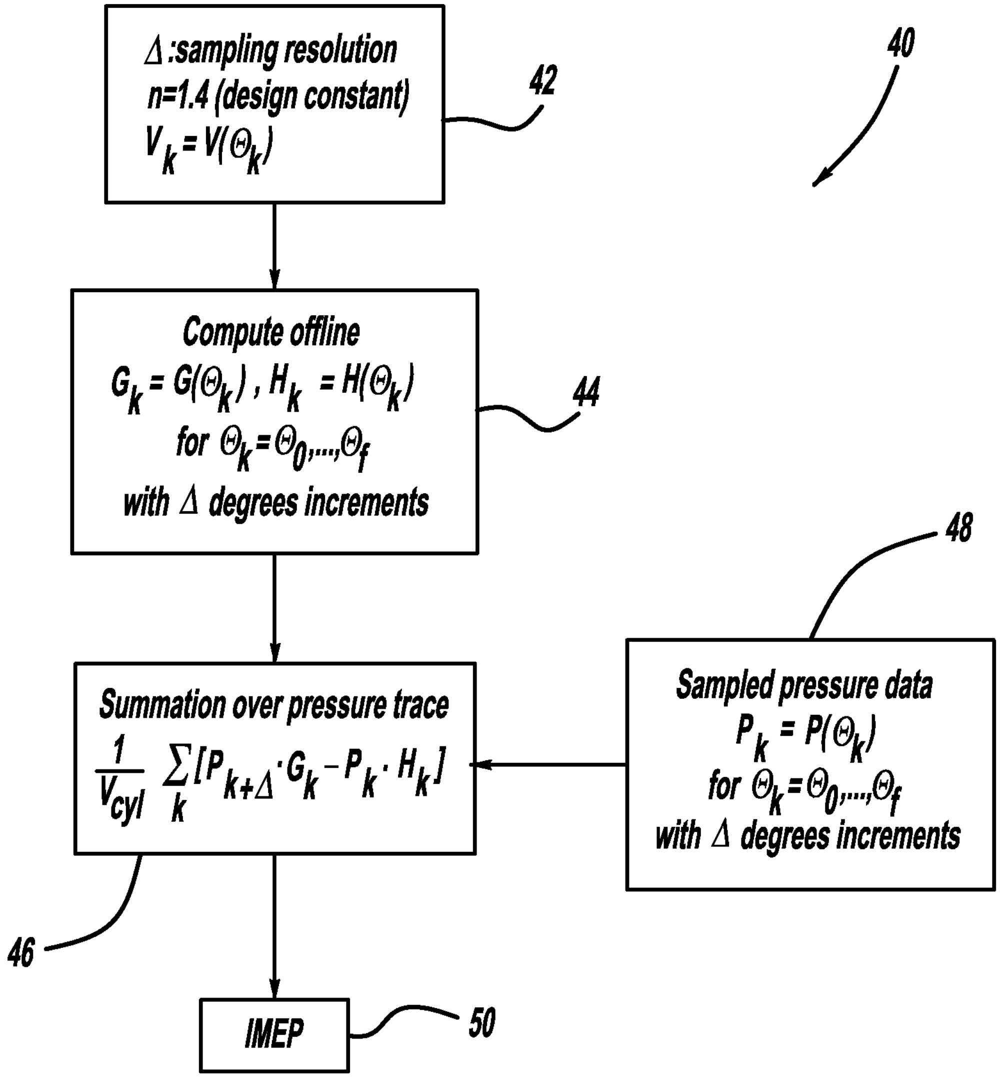
FIG. 2 is a flow chart diagram of a first method for calculating indicated mean effective pressure using sparse input data.

FIG. 2 is a flow chart diagram 40 of the indirect integration method for computing IMEP discussed in the preceding paragraphs. At box 42, initial values are defined, where Δ is the sampling resolution, n is set equal to 1.4 which is the normal specific heat ratio for air, and values of $V_k$ are calculated as the cylinder volume as a function of the crank angle θ at each sampling event k. At box 44, values for the volume-related terms $G_k$ and $H_k$ are computed as a function of the crank angle θ at each sampling event k. The calculations of the box 44 are also completed in an initialization phase prior to real-time engine operation, as the calculations are a function only of engine geometry and the chosen crank angle increment Δ. During engine operation, the real-time calculation of IMEP is handled at box 46 using Equation (11) in a summation over one engine power cycle, where the cylinder pressure data is sampled at each crank angle θ corresponding to a crank angle increment Δ, as shown at box 48. The pressure data in the box 48 is measured by cylinder pressure sensors 22. At the end of one complete engine power cycle, the value of IMEP is output at box 50 as the result of the summation at the box 46. The IMEP value from the box 50 is then used by the engine controller 24 to control engine operation, as discussed previously.

In a second embodiment of the present invention, a cubic spline integration method of computing IMEP in an engine is provided. In the cubic spline integration method, a cubic spline is fitted to the integral Equation (1). This allows IMEP to be calculated with sufficient accuracy, even when using sparse cylinder pressure data. According to this method, $f(x)$ is defined as a continuous function, as follows;

$$f(x) = \frac{1}{V_{cyl}} \cdot P\frac{dV}{d\theta} \tag{12}$$

Where $V_{cyl}$ is cylinder volume, P is cylinder pressure, and dV/dθ is the first derivative of cylinder volume with respect to crank angle position θ.

The function $f(x)$ is defined to have a continuous third derivative through the interval [a, b], where;

$$a=x_0<x_1< \ldots <x_{n-1}<x_n=b \tag{13}$$

It can be seen from Equation (1) and Equation (12) that a value for IMEP can be obtained by integrating the function $f(x)$ over one power cycle, that is, from;

$$x_0 = 180° \cdot \frac{\pi}{180°} \tag{14}$$

to;

$$x_n \cong +179° \cdot \frac{\pi}{180°} \tag{15}$$

Therefore an equation for IMEP can be written as;

$$IMEP = S_{\theta_f} \cong \frac{1}{V_{cyl}} \int_{\theta_o}^{\theta_f} P dV \tag{16}$$

Where the function S is the cubic spline integral of $f$, $\theta_0=x_0$ and $\theta_f=x_n$.

An algorithm for computing IMEP via the cubic spline integral S is defined as follows. First, a function M is defined as the first derivative of $f$. Solving for Mat the initial point $\theta_0$ yields;

$$M_0 = f'(\theta_0) = \frac{1}{V_{cyl}} \cdot \left(P'(\theta_0)\frac{dV}{d\theta}(\theta_o) + P(\theta_0)\frac{d^2V}{d^2\theta}(\theta_0)\right) \tag{17}$$

In Equation (17), $\theta_0$ is the beginning of the power cycle, that is, the beginning of the compression stroke, which is at a crank position of Bottom Dead Center (BDC), or −π. At this point, the cylinder pressure can be approximated as constant, and therefore;

$$P'(\theta_0)=0 \tag{18}$$

$P(\theta_0)$ can be easily obtained from the cylinder pressure sensor 22.

In order to resolve the first and second derivative terms of Equation (17), a formulation for volume V as a function of crank angle θ is needed. This can be expressed as follows;

$$V(\theta)=K_1-K_2(\cos(\theta)+\sqrt{R^2-\sin^2(\theta)}) \tag{19}$$

Where $K_1$ and $K_2$ are engine-related constants, and R is defined as r/L, with r being the crank radius and L being the connecting rod length. From Equation (19), the calculation of dV/dθ and $d^2V/d^2\theta$ become straightforward to one skilled in the art.

Next, a crank angle increment h is defined such that;

$$h=\theta_i-\theta_{i-1} \tag{20}$$

Where h can be defined as any value which may be suitable for the purpose, and i is step number. Since the objective of this method is to compute a value of IMEP using sparse cylinder pressure data, values of h which are significantly larger than 1 degree of crank angle will be explored, such as 3 degrees or 6 degrees.

Now a recursive calculation can be set up, where each power cycle of the engine 10 begins by initializing;

$$M_0 = f'(\theta_0) = \frac{1}{V_{cyl}} \cdot \left(P(\theta_0)\frac{d^2V}{d^2\theta}(\theta_0)\right) \tag{21}$$

Where $P(\theta_0)$ is the measured cylinder pressure at the cycle initiation location of Bottom Dead Center, $V_{cyl}$ is total cylinder volume, and $(d^2V/d^2\theta)(\theta_0)$ is the second derivative of Equation (19) evaluated at the cycle initiation location of BDC. Also, at the cycle initiation, $f_0=0$ because the factor dV/dθ is zero at BDC, and $S_0=0$ by definition.

Then, for each step i of crank angle increment h, the functions $f$ and M can be solved sequentially as follows;

$$f_i = f(\theta_i) = \frac{1}{V_{cyl}} \cdot P(\theta_i) \cdot P(\theta_i) \cdot \frac{dV}{d\theta}(\theta_i) \tag{22}$$

and;

$$M_i = \frac{2(f_i - f_{i-1})}{h} - M_{i-1} \tag{23}$$

Where $P(\theta_i)$ is the measured cylinder pressure at the current step i, $(dV/d\theta)(\theta_i)$ is the first derivative of V with respect to θ evaluated at the current step i, and h is the crank angle increment.

Then the cumulative cubic spline function S can be calculated from the previous value of S, the current and previous values of M, and the previous value of ƒ, as follows;

$$S_i = S_{i-1} + \frac{1}{6}h^2(M_i + 2M_{i-1}) + hf_{i-1} \quad (24)$$

The function S is calculated in a cumulative fashion from a value of $S_0=0$ at cycle initiation until the power cycle ends when $\theta_i=\theta_f$, which is at BDC at the end of the power stroke. At that point, IMEP for the completed power cycle is output as the final value of S; that is, IMEP=$S_{\theta_f}$. Then a new cycle is initiated.

Figure 3:
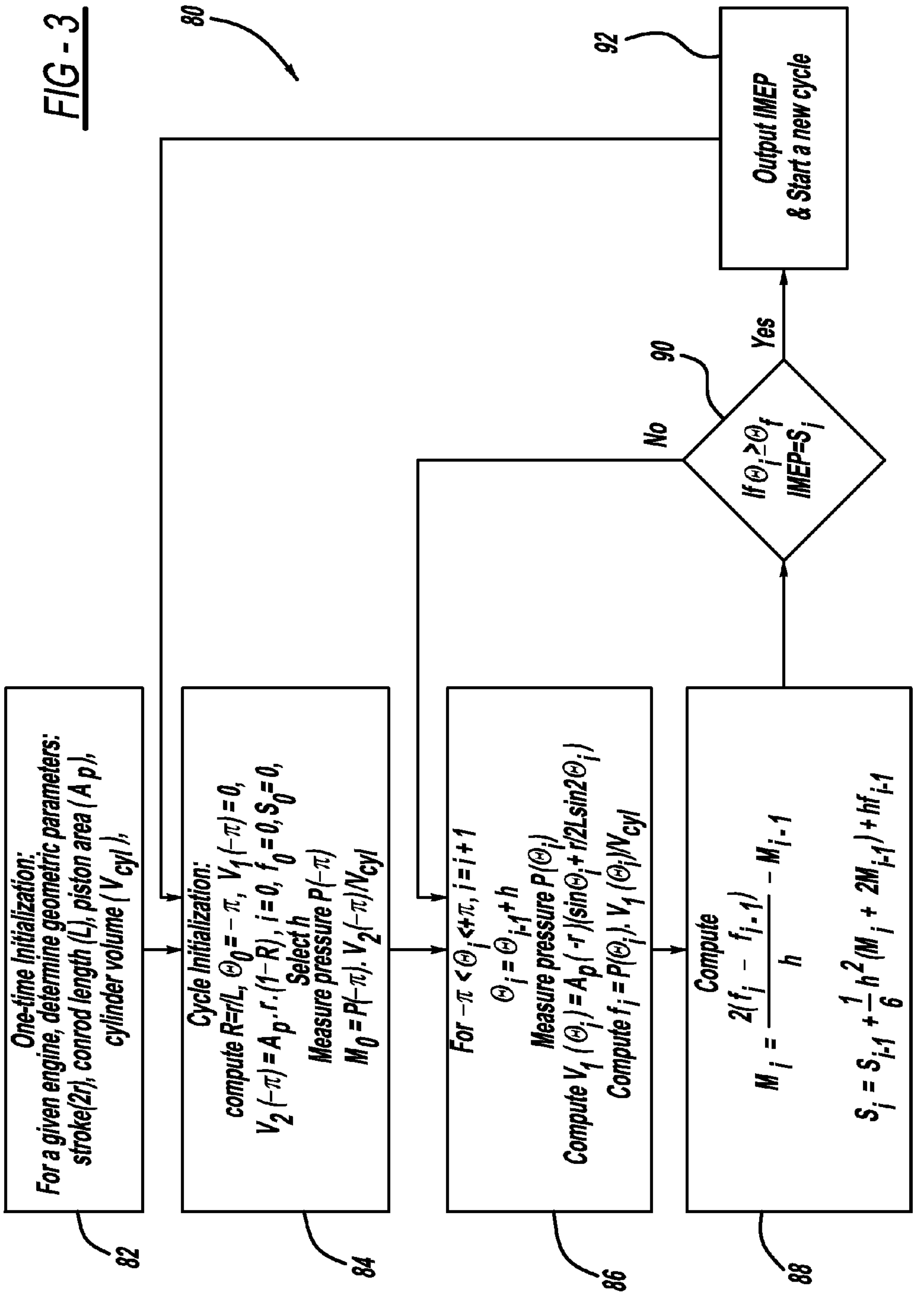
FIG. 3 is a flow chart diagram of a second method for calculating indicated mean effective pressure using sparse input data.

FIG. 3 is a flow chart diagram 80 of the cubic spline integration method of computing IMEP discussed in the preceding paragraphs. One-time initialization calculations are handled at box 82. The values computed at the box 82 are constants associated with a particular engine design, such as stroke, connecting rod length, piston area, and cylinder volume. At box 84, cycle initiation calculations take place. These calculations include measuring cylinder pressure P and calculating the first and second derivatives of V and the functions ƒ, M, and S—all at the cycle initiation location of $\theta=\theta_0=-\pi$, which is at BDC before the compression stroke. At box 86, cylinder pressure P is measured, the first derivative of V is calculated, and the function ƒ is evaluated for each step i. At box 88, the functions M and S are evaluated per Equations (23) and (24). At decision diamond 90, the crank angle θ is checked to see if the power cycle has been completed. If $\theta_i \geq \theta_f$, then at box 92 the value of IMEP for the cycle is output as the final value of S, and a new cycle is started at the box 84. If $\theta_i < O_f$ at the decision diamond 90, then the current cycle calculations continue at the box 86 for the next step i.

Both the indirect integration method and the cubic spline integration method of computing IMEP have been tested with simulations using real engine data. IMEP calculations using the disclosed methods with sparse data (sampling resolution at crank rotation increments of 3 degrees and 6 degrees) were found to be within 2% of IMEP calculations using dense data (crank rotation increment of 1 degree) in a traditional trapezoidal approximation. This variance of less than 2% is well within an acceptable range for using IMEP in the engine controller 24. Even sampling resolutions as large as 10 degrees were found to produce acceptable IMEP results using the disclosed methods. By using cylinder pressure data at crank position increments of 6 degrees instead of 1 degree, the disclosed methods achieve the desired goal of relaxing the requirements of high-resolution crank position and cylinder pressure data, and enable a reduction in the total cost of pressure-based engine control systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for computing mean effective pressure in an internal combustion engine, said method comprising:

determining a set of geometric parameters for the engine, including stroke, connecting rod length, piston area, and cylinder volume;

defining a sampling resolution for a series of sampling events, said sampling resolution being an amount of crankshaft rotation between the sampling events;

computing and storing a volume array, said volume array containing combustion chamber volume as a function of crankshaft position for each crankshaft position corresponding to the sampling resolution;

computing and storing arrays of first and second derivatives of the combustion chamber volume with respect to crankshaft position, evaluated at each crankshaft position corresponding to the sampling resolution;

defining a first function f, where f is a function of cylinder pressure and the first derivative of combustion chamber volume with respect to crankshaft position;

defining a second function M, where M is a function of the first function f, the sampling resolution, and a previous value of M;

defining a cubic spline function S, where S is a function of the first function f, current and previous values of the second function M, the sampling resolution, and a previous value of S;

running the engine;

initializing a cycle by evaluating the volume array, the first and second derivative of volume arrays, the first function f, the second function M, and the cubic spline function S, where all arrays and functions are evaluated at a crankshaft position of bottom dead center at the beginning of a cycle;

taking a cylinder pressure measurement at each crankshaft position corresponding to the sampling resolution;

storing the cylinder pressure measurement for a current sampling event for calculation purposes;

calculating the first function f based on the cylinder pressure measurement for the current sampling event and the first derivative of volume array;

computing the second function M and the cubic spline function S for the current sampling event;

storing values of the first function f, the second function M, and the cubic spline function S for the current sampling event and a previous sampling event;

continuing to measure cylinder pressure and calculate the first function f, the second function M, and the cubic spline function S, as long as the crankshaft position has not reached bottom dead center upon completion of one full crankshaft rotation from initiation of the cycle; and outputting mean effective pressure for an engine cycle as a final value of the cubic spline function, and initializing a new cycle, when the crankshaft position reaches bottom dead center upon completion of one full crankshaft rotation from initiation of the cycle.

2. The method of claim 1 wherein the first function f is defined by the equation:

$$f_i = f(\theta_i) = \frac{1}{V_{cyl}} \cdot P(\theta_i) \cdot \frac{dV}{d\theta}(\theta_i)$$

where i is the sampling event number, $\theta_i$ is the crankshaft position at the current sampling event, $V_{cyl}$ is the cylinder volume, $P(\theta_i)$ is the cylinder pressure at the current sampling event, and $dV/d\theta(\theta_i)$ is the first derivative of volume with respect to crankshaft position evaluated at the current crankshaft position.

3. The method of claim 2 wherein the second function M is defined by the equation:

$$M_i = \frac{2(f_i - f_{i-1})}{h} - M_{i-1}$$

where i is the sampling event number, h is the sampling resolution, $f_i$ is the function $f$ evaluated at the current sampling event, and $f_{i-1}$ and $M_{i-1}$ are the functions $f$ and M, respectively, evaluated at the previous sampling event.

4. The method of claim 3 wherein the cubic spline function S is defined by the equation:

$$S_i = S_{i-1} + \frac{1}{6}h^2(M_i + 2M_{i-1}) + hf_{i-1}$$

where i is the sampling event number, h is the sampling resolution, $M_i$ is the function M evaluated at the current sampling event, and $f_{i-1}$, $M_{i-1}$, and $S_{i-1}$ are functions $f$, M, and S, respectively, evaluated at the previous sampling event.

5. The method of claim 1 wherein the sampling resolution is three degrees or greater of crankshaft rotation.

6. The method of claim 1 wherein the sampling resolution is six degrees or greater of crankshaft rotation.

7. The method of claim 1 further comprising using the calculated value of mean effective pressure in an engine controller to control operation of the engine.

8. A method for computing and using indicated mean effective pressure in an internal combustion engine, said method comprising:

determining a set of geometric parameters for the engine, including stroke, connecting rod length, piston area, and cylinder volume;

defining a sampling resolution for a series of sampling events, said sampling resolution being an amount of crankshaft rotation between the sampling events;

computing and storing a volume array, said volume array containing combustion chamber volume as a function of crankshaft position for each crankshaft position corresponding to the sampling resolution;

computing and storing arrays of first and second derivatives of the combustion chamber volume with respect to crankshaft position, evaluated at each crankshaft position corresponding to the sampling resolution;

defining a first function f, where f is a function of cylinder pressure and the first derivative of combustion chamber volume with respect to crankshaft position;

defining a second function M, where M is a function of the first function f, the sampling resolution, and a previous value of M;

defining a cubic spline function S, where S is a function of the first function f, current and previous values of the second function M, the sampling resolution, and a previous value of S;

running the engine;

initializing a cycle by evaluating the volume array, the first and second derivative of volume arrays, the first function f, the second function M, and the cubic spline function S, where all arrays and functions are evaluated at a crankshaft position of bottom dead center at the beginning of a compression stroke;

taking a cylinder pressure measurement at each crankshaft position corresponding to the sampling resolution;

storing the cylinder pressure measurement for a current sampling event for calculation purposes;

calculating the first function f based on the cylinder pressure measurement for the current sampling event and the first derivative of volume array;

computing the second function M and the cubic spline function S for the current sampling event;

storing values of the first function f, the second function M, and the cubic spline function S for the current sampling event and a previous sampling event;

continuing to measure cylinder pressure and calculate the first function f, the second function M, and the cubic spline function S, as long as the crankshaft position has not reached bottom dead center at the end of a power stroke;

outputting indicated mean effective pressure for an engine cycle as a final value of the cubic spline function, and initializing a new cycle, when the crankshaft position reaches bottom dead center at the end of a power stroke; and using the calculated value of indicated mean effective pressure in an engine controller to control operation of the engine, including control of fuel flow to the engine.

9. The method of claim 8 wherein the first function f is defined by the equation:

$$f_i = f(\theta_i) = \frac{1}{V_{cyl}} \cdot P(\theta_i) \cdot \frac{dV}{d\theta}(\theta_i)$$

where i is the sampling event number, $\theta_i$ is the crankshaft position at the current sampling event, $V_{cyl}$ is the cylinder volume, $P(\theta_i)$ is the cylinder pressure at the current sampling event, and $dV/d\theta(\theta_i)$ is the first derivative of volume with respect to crankshaft position evaluated at the current crankshaft position.

10. The method of claim 9 wherein the second function M is defined by the equation:

$$M_i = \frac{2(f_i - f_{i-1})}{h} - M_{i-1}$$

where i is the sampling event number, h is the sampling resolution, $f_i$ is the function $f$ evaluated at the current sampling event, and $f_{i-1}$ and $M_{i-1}$ are the functions $f$ and M, respectively, evaluated at the previous sampling event.

11. The method of claim 10 wherein the cubic spline function S is defined by the equation:

$$S_i = S_{i-1} + \frac{1}{6}h^2(M_i + 2M_{i-1}) + hf_{i-1}$$

where i is the sampling event number, h is the sampling resolution, $M_i$ is the function M evaluated at the current sampling event, and $f_{i-1}$, $M_{i-1}$, and $S_{i-1}$ are functions $f$, M, and S, respectively, evaluated at the previous sampling event.

12. The method of claim 11 wherein the sampling resolution is three degrees or greater of crankshaft rotation.

13. The method of claim 12 wherein the sampling resolution is six degrees or greater of crankshaft rotation.

14. A system for computing and using indicated mean effective pressure in an internal combustion engine, said system comprising:

a low-resolution crankshaft position encoder for measuring crankshaft position at a sampling resolution, where the sampling resolution is greater than one degree of crankshaft rotation;

a cylinder pressure sensor for measuring cylinder pressure at each crankshaft position corresponding to the sampling resolution; and an engine controller configured to collect data from the crankshaft position encoder and the cylinder pressure sensor, calculate indicated mean effective pressure using a cubic spline integration algorithm, and use the calculated indicated mean effective pressure to control operation of the engine.

15. The system of claim 14 wherein the cubic spline integration algorithm includes:

determining a set of geometric parameters for the engine, including stroke, connecting rod length, piston area, and cylinder volume;

defining a sampling resolution, said sampling resolution being the amount of crankshaft rotation between sampling events;

computing and storing a volume array, said volume array containing combustion chamber volume as a function of crankshaft position for each crankshaft position corresponding to the sampling resolution;

computing and storing arrays of first and second derivatives of combustion chamber volume with respect to crankshaft position, evaluated at each crankshaft position corresponding to the sampling resolution;

defining a first function f, where f is a function of cylinder pressure and the first derivative of combustion chamber volume with respect to crankshaft position;

defining a second function M, where M is a function of the first function f, the sampling resolution, and a previous value of M;

defining a cubic spline function S, where S is a function of the first function f, current and previous values of the second function M, the sampling resolution, and a previous value of S;

running the engine;

initializing a cycle by evaluating the volume array, the first and second derivative of volume arrays, the first function f, the second function M, and the cubic spline function S, where all arrays and functions are evaluated at a crankshaft position of bottom dead center at the beginning of a compression stroke;

taking a cylinder pressure measurement at each crankshaft position corresponding to the sampling resolution;

storing the cylinder pressure measurement for a current sampling event for calculation purposes;

calculating the first function f based on the cylinder pressure measurement for the current sampling event and the first derivative of volume array;

computing the second function M and the cubic spline function S for the current sampling event;

storing values of the first function f, the second function M, and the cubic spline function S for the current sampling event and a previous sampling event;

continuing to measure cylinder pressure and calculate the first function f, the second function M, and the cubic spline function S, as long as the crankshaft position has not reached bottom dead center at the end of a power stroke; and outputting indicated mean effective pressure for an engine cycle as a final value of the cubic spline function, and initializing a new cycle, when the crankshaft position reaches bottom dead center at the end of a power stroke.

16. The system of claim 15 wherein the first function f is defined by the equation:

$$f_i = f(\theta_i) = \frac{1}{V_{cyl}} \cdot P(\theta_i) \cdot \frac{dV}{d\theta}(\theta_i)$$

where i is the sampling event number, $\theta_i$ is the crankshaft position at the current sampling event, $V_{cyl}$ is the cylinder volume, $P(\theta_i)$ is the cylinder pressure at the current sampling event, and $dV/d\theta(\theta_i)$ is the first derivative of volume with respect to crankshaft position evaluated at the current crankshaft position.

17. The system of claim 16 wherein the second function M is defined by the equation:

$$M_i = \frac{2(f_i - f_{i-1})}{h} - M_{i-1}$$

where i is the sampling event number, h is the sampling resolution, $f_i$ is the function $f$ evaluated at the current sampling event, and $f_{i-1}$ and $M_{i-1}$ are the functions $f$ and M, respectively, evaluated at the previous sampling event.

18. The system of claim 17 wherein the cubic spline function S is defined by the equation:

$$S_i = S_{i-1} + \frac{1}{6}h^2(M_i + 2M_{i-1}) + hf_{i-1}$$

where i is the sampling event number, h is the sampling resolution, $M_i$ is the function M evaluated at the current sampling event, and $f_{i-1}$, $M_{i-1}$, and $S_{i-1}$ are functions $f$, M, and S, respectively, evaluated at the previous sampling event.

19. The system of claim 14 wherein the sampling resolution is three degrees or greater of crankshaft rotation.

20. The system of claim 14 wherein the engine controller uses the calculated indicated mean effective pressure to control fuel flow to the engine.

* * * * *